United States Patent
Inoue et al.

(10) Patent No.: US 8,878,099 B2
(45) Date of Patent: Nov. 4, 2014

(54) FLUX CORED WIRE FOR WELDING DUPLEX STAINLESS STEEL WHICH REFINES SOLIDIFIED CRYSTAL GRAINS

(75) Inventors: Hiroshige Inoue, Tokyo (JP); Manabu Mizumoto, Tokyo (JP); Takashi Namekata, Tokyo (JP); Yusuke Oikawa, Tokyo (JP)

(73) Assignee: Nippon Steel & Sumikin Stainless Steel Corporation, Tokyo (JP)

( * ) Notice: Subject to any disclaimer, the term of this patent is extended or adjusted under 35 U.S.C. 154(b) by 0 days.

(21) Appl. No.: 12/736,844

(22) PCT Filed: May 27, 2009

(86) PCT No.: PCT/JP2009/060100
§ 371 (c)(1),
(2), (4) Date: Nov. 10, 2010

(87) PCT Pub. No.: WO2009/145347
PCT Pub. Date: Dec. 3, 2009

(65) Prior Publication Data
US 2011/0062133 A1  Mar. 17, 2011

(30) Foreign Application Priority Data

May 27, 2008  (JP) .................................. 2008-138550
Mar. 19, 2009  (JP) .................................. 2009-068987

(51) Int. Cl.
| | |
|---|---|
| *B23K 35/02* | (2006.01) |
| *C22C 38/22* | (2006.01) |
| *B23K 35/36* | (2006.01) |
| *B23K 35/30* | (2006.01) |
| *B23K 35/368* | (2006.01) |
| *C22C 38/40* | (2006.01) |
| *C22C 38/38* | (2006.01) |

(52) U.S. Cl.
CPC .............. *B23K 35/3053* (2013.01); *C22C 38/22* (2013.01); *B23K 35/361* (2013.01); *B23K 35/308* (2013.01); *B23K 35/3605* (2013.01); *B23K 35/368* (2013.01); *C22C 38/40* (2013.01); *B23K 35/3608* (2013.01); *B23K 35/3602* (2013.01); *B23K 35/3607* (2013.01); *C22C 38/38* (2013.01); *B23K 35/3086* (2013.01)
USPC .............. 219/145.22; 219/145.1; 219/146.23; 219/146.31

(58) Field of Classification Search
CPC .............. B23K 35/02; B23K 35/3053; B23K 35/3086; B23K 35/3602; B23K 35/3605; B23K 35/3608; B23K 35/361; B23K 35/308; B23K 35/368; C22C 38/40
USPC ................ 219/145.22, 146.23, 146.31, 145.1
See application file for complete search history.

(56) References Cited

U.S. PATENT DOCUMENTS

| | | | | |
|---|---|---|---|---|
| 4,125,758 A | * | 11/1978 | Oishi et al. ..................... | 219/126 |
| 4,137,446 A | * | 1/1979 | Blanpain et al. ......... | 219/145.22 |
| 4,203,188 A | * | 5/1980 | Blanpain et al. .................. | 419/4 |
| 4,571,480 A | * | 2/1986 | Sakai et al. ................ | 219/146.3 |
| 4,632,882 A | * | 12/1986 | Werner et al. .................. | 428/558 |
| 5,120,931 A | * | 6/1992 | Kotecki et al. ........... | 219/146.22 |
| 5,124,529 A | * | 6/1992 | Nishikawa et al. ...... | 219/146.22 |
| 5,219,425 A | * | 6/1993 | Nishikawa et al. .......... | 228/56.3 |
| 5,378,871 A | * | 1/1995 | Nishikawa et al. ...... | 219/145.22 |
| 5,430,269 A | * | 7/1995 | Natsume et al. ................ | 219/73 |
| 5,580,475 A | * | 12/1996 | Sakai et al. .............. | 219/145.22 |
| 5,854,463 A | * | 12/1998 | Yamashita et al. ........ | 219/145.22 |
| 5,861,605 A | * | 1/1999 | Ogawa et al. ............ | 219/145.22 |
| 6,042,782 A | | 3/2000 | Murata et al. | |
| 6,339,209 B1 | * | 1/2002 | Kotecki ..................... | 219/146.23 |
| 6,340,396 B1 | | 1/2002 | Ogawa et al. | |
| 6,479,796 B2 | * | 11/2002 | Goto et al. ................ | 219/145.22 |
| 6,664,508 B1 | * | 12/2003 | Johnson et al. ........ | 219/137 WM |
| 7,491,910 B2 | * | 2/2009 | Kapoor et al. ............ | 219/146.23 |
| 2002/0003135 A1 | * | 1/2002 | Goto et al. ................ | 219/145.22 |
| 2002/0090159 A1 | * | 7/2002 | Miyamaru et al. ................ | 385/1 |
| 2002/0148533 A1 | | 10/2002 | Kim et al. | |
| 2002/0153364 A1 | * | 10/2002 | North et al. ........... | 219/137 WM |

(Continued)

FOREIGN PATENT DOCUMENTS

| | | |
|---|---|---|
| EP | 0 867 256 | 9/1998 |
| EP | 2 050 832 | 4/2009 |

(Continued)

OTHER PUBLICATIONS

Jang et al, Effect of CrNi equivalent ratio on ductility-dip cracking in AISI 316L weld metals, Jun. 12, 2010, Materials and Design, 32 (2011) 371-376.*

(Continued)

Primary Examiner — Dana Ross
Assistant Examiner — Brett Spurlock
(74) Attorney, Agent, or Firm — Kenyon & Kenyon LLP

(57) ABSTRACT

The present invention provides flux cored wire for welding duplex stainless steel which refines the solidified crystal grains for obtaining weld metal superior in toughness and ductility, characterized by containing, as the chemical ingredients included in the steel sheath and flux, by mass % with respect to the mass of the wire as a whole, C: 0.001 to 0.1%, Si: 0.01 to 1.0%, Mn: 2.0 to 6.0%, Cr: 17.0 to 27.0%, Ni: 1.0 to 10.0%, Mo: 0.1 to 3.0%, Al: 0.002 to 0.05%, Mg: 0.0005 to 0.01%, Ti: 0.001 to 0.5%, and N: 0.10 to 0.30%, further limiting P to 0.03% or less and S to 0.01% or less, satisfying 0.73×Cr equivalents−Ni equivalents≥4.0 and Ti (mass %)×N (mass %)≥0.0004, and having a balance of iron and unavoidable impurities.

2 Claims, No Drawings

(56) References Cited

U.S. PATENT DOCUMENTS

| | | | |
|---|---|---|---|
| 2004/0232131 A1* | 11/2004 | North et al. | 219/145.22 |
| 2006/0165552 A1* | 7/2006 | Kapoor et al. | 420/70 |
| 2006/0207984 A1* | 9/2006 | Karogal | 219/145.22 |
| 2006/0255026 A1* | 11/2006 | North et al. | 219/137 WM |

FOREIGN PATENT DOCUMENTS

| | | | | |
|---|---|---|---|---|
| JP | 52-143913 | | 11/1977 | |
| JP | 58-6792 | | 1/1983 | |
| JP | 59-54493 | | 3/1984 | |
| JP | 62192297 A | * | 8/1987 | ........... B23K 35/368 |
| JP | 62-286677 | | 12/1987 | |
| JP | 1-202395 | | 8/1989 | |
| JP | 3-71902 | | 3/1991 | |
| JP | 3-204196 | | 9/1991 | |
| JP | 4-143255 | | 5/1992 | |
| JP | 8-277423 | | 10/1996 | |
| JP | 9-308988 | | 12/1997 | |
| JP | 2000-176681 | | 6/2000 | |
| JP | 2001-138092 | | 5/2001 | |
| JP | 2002-113591 | | 4/2002 | |
| JP | 2002-331387 | | 11/2002 | |
| JP | 2003-136280 | | 5/2003 | |
| JP | 2006-233308 | | 9/2006 | |
| JP | 2007-84841 | | 4/2007 | |
| WO | WO 98/10888 | | 3/1998 | |
| WO | WO 02/27056 | | 4/2002 | |

OTHER PUBLICATIONS

Lee et al, Pitting corrosion behavior on crack property in AISI 304L weld metals with varying CrNi equivalent ratio, Jan. 25, 2009, Materials and Design, 30 (2009) 3269-3273.*

Pujar et al, Evaluation of Microstructure and Electrochemical Corrosion Behavior of Austenitic 316 Stainless Steel Weld Metals with Varying Chemical Compositions, Journal of Materials Engineering and Performance, Jun. 2005, vol. 14, Issue 3, pp. 327-342.*

P.S. Korinko and S.H. Malene, Considerations for the Weldability of Types 304L and 316L Stainless Steel, Aug. 2001, ASM International, vol. 1(4), 61-68.*

Lundin, DeLong and Spond, Ferrite-Fissuring Relationship in Austenitic Stainless Steel Weld Metals, Aug. 1975, AWS Welding Research, http://www.aws.org/wj/supplement/WJ_1975_08_s241.pdf.*

International Search Report dated Aug. 11, 2009 issued in corresponding PCT Application No. PCT/JP2009/060100.

Japanese Office Action dated Nov. 24, 2009 issued in corresponding Japanese Application No. 2009-543303.

European Search Report dated Apr. 19, 2011 issued in corresponding EP Application No. EP 09 75 4855.

N. Suutala, T. Takalo and T. Moisio, "The Relationship Between Solidification and Microstructure in Austenite and Austenitic-Ferritic Stainless Steel Welds", *Metallurgical Transactions A.*, vol. 10A (1979), p. 512-514.

J.C. Lippold and W.F. Savage, "Solidification of Austenitic Stainless Steel Weldments: Part 1", *Welding Journal*, vol. 58, (1979), p. 365s-374s.

H. Inoue, T. Koseki, S. Ohkita, and M. Fuji, "Solidification and Transformation Behavior of Austenitic Stainless Steel Weld Metal Solidified as Primary Ferrite", *Quarterly Journal of the Japan Welding Society*, vol. 15 (1997), p. 88-99.

T. Koseki, H. Inoue, "Equiaxed Solidification of Steel Nucleating on Titanium Nitride", *Journal of the Japan Institute of Metals and Materials*, vol. 65 (2001), p. 644-651.

H. Inoue, T. Koseki, "Proposal of Independent Two Phase Growth during Solidification in Austenitic Stainless Steels", *Proceedings of the 7th International Conference on Trends in Welding Research*, May 16-20, 2005, p. 29-34.

C.J. Long and W.T. Delong, "The Ferrite Content of Austenitic Stainless Steel Weld Metals," Weld Journal, vol. 52, No. 7, Jul. 1973, 281s-297s.

A.L. Schaeffler, "Constitution Diagram for Stainless Steel Weld Metal," Metal Progress, vol. 56, No. 1, Jul. 1949, p. 680.

* cited by examiner

FLUX CORED WIRE FOR WELDING DUPLEX STAINLESS STEEL WHICH REFINES SOLIDIFIED CRYSTAL GRAINS

This application is a national stage application of International Application No. PCT/JP2009/060100, filed 27 May 2009, which claims priority to Japanese Application Nos. 2008-138550, filed 27 May 2008, and 2009-068987, filed 19 Mar. 2009, each of which is incorporated by reference in its entirety.

TECHNICAL FIELD

The present invention relates to a weld wire for duplex stainless steel, more particularly relates to a flux cored wire for welding duplex stainless steel which refines the crystal grains at the time of weld solidification and thereby imparts superior properties of toughness and ductility to the weld metal.

BACKGROUND ART

Duplex stainless steel is stainless steel having Cr, Ni, and No as main elements and adjusting the ferrite and austenite to a phase ratio of about 50% so as to secure toughness and corrosion resistance. When welding this duplex stainless steel, most of the time, from the viewpoint of maintaining the corrosion resistance, no heat treatment is applied after welding. The weld metal is used as solidified. Therefore, compared with steel materials of the same composition which are rolled and heat treated, the weld metal becomes remarkably coarse in crystal grain size and inferior in toughness and ductility. Therefore, when welding duplex stainless steel, refining the solidified crystal grains of the weld metal could be an effective method for improving the toughness and ductility of the weld metal.

As methods for refining the crystal grains of stainless steel, the method of defining the rolling conditions of the steel slab (relation of reduction rate and temperature) for suppressing the occurrence of roping (unevenness of surface) (for example, see PLT 1) and the method of defining the hot rolling and cooling conditions after casting (for example, see PLT 2) have been disclosed, but both of these utilize control of the structure by transformation in the reheating-hot rolling or annealing-cooling process after solidification of the molten steel. They are not techniques for refining the crystal grains in the process of solidification of weld metal. They are not methods effective for refining the grain size of the weld metal of duplex stainless steel enabling use as solidified after welding.

As methods of refining the crystal grains of stainless steel weld metal as solidified, methods of using inclusions as seeding nuclei for causing solidification of equiaxial crystal grains are being disclosed (see PLT's 3 and 4). These are martensitic stainless steel and austenitic stainless steel and differ from the duplex stainless steel covered by the present invention in the ratio of the amount of Mn and the amounts of Cr/Ni.

Further, in duplex stainless steel, due to the recent soaring prices of Ni and Mo, inexpensive type duplex stainless steel reduced in amounts of Ni and Mo (for example, see PLT 5) is being developed, but even when welding such duplex stainless steel, duplex stainless steel-based welding materials with coarse solidified crystal grains like in the past are being used.

In view of this backdrop, development of wire for welding duplex stainless steel able to be used even for inexpensive type duplex stainless steel, enabling the solidified crystal grains of the weld metal to be refined, and as a result enabling a weld zone with good toughness, ductility, and other mechanical properties of the weld metal to be obtained even in the state as welded has been desired.

CITATION LIST

Patent Literature

PLT 1: Japanese Patent Publication (A) No. 03-071902
PLT 2: Japanese Patent Publication (A) No. 08-277423
PLT 3: Japanese Patent Publication (A) No. 2002-331387
PLT 4: Japanese Patent Publication (A) No. 2003-136280
PLT 5: WO-2002-027056

SUMMARY OF INVENTION

Technical Solution

The present invention was made in consideration of the above problems of the prior art and has as its object to provide a flux cored wire for welding duplex stainless steel which defines the ingredients of the weld material used when welding duplex stainless steel material to thereby enable the solidified crystal grains of the weld metal to be made finer and to thereby obtain a weld zone with a good toughness, ductility, and other mechanical properties of the weld metal even in the state as welded.

Solution to Problem

The present invention solves the above problem and has as its gist the following:
(1) A flux cored wire for welding duplex stainless steel comprising a steel sheath inside of which a flux is filled, designed to refine solidified crystal grains, said flux cored wire for welding duplex stainless characterized by containing, as the chemical ingredients included in the steel sheath and flux, by mass % with respect to the mass of the wire as a whole, C: 0.001 to 0.1%, Si: 0.01 to 1.0%, Mn: 2.0 to 6.0%, Cr: 17.0 to 27.0%, Ni: 1.0 to 10.0%, Mo: 0.1 to 3.0%, Al: 0.002 to 0.05%, Mg: 0.0005 to 0.01%, Ti: 0.001 to 0.5%, and N: 0.10 to 0.30%, furthermore restricting P to 0.03% or less and S to 0.01% or less, satisfying 0.73×Cr equivalents−Ni equivalents≥4.0 and Ti (mass %)×N (mass %)≥0.0004, and having a balance of iron and unavoidable impurities, where Cr equivalents=Cr (mass %)+Mo (mass %)+1.5×Si (mass %) and Ni equivalents=Ni (mass %)+0.5×Mn (mass %)+30×C (mass %)+30×N (mass %)
(2) A flux cored wire for welding duplex stainless steel designed to refine solidified crystal grains as set forth in (1), characterized by further containing, as a chemical ingredient included in the steel sheath and flux of the flux cored wire for welding duplex stainless steel, by mass %, Cu: 0.1 to 2.0%.

Advantageous Effects of Invention

According to the present invention, both when welding ordinary duplex stainless steel materials and inexpensive type duplex stainless steel materials, by prescribing the ingredients of the weld material used, it is possible to enable the weld metal structure to be refined and thereby possible to greatly improve the toughness and ductility of the weld metal.

EMBODIMENTS OF INVENTION

The inventors engaged in a detailed investigation and study of the structure, toughness, and ductility of the weld metal formed when butt welding a duplex stainless steel material by TIG welding using Cr—Ni-based stainless steel wire to which various chemical ingredients are added.

As a result, the fact that by adding Mg and Ti in combination to the ingredients before solidification is completed in the single ferrite phase, equiaxing and refining of the crystal grains of the weld metal structure are achieved and thereby the toughness and ductility of the weld metal are improved became newly clear. Further, the inventors learned the prospect that in ingredients where solidification is completed in the single ferrite phase, by controlling the relationship between the amounts of Ti and N, refinement of the solidified crystal grains of the weld metal could become easy and the toughness and ductility could be improved even in the state as solidified.

The present invention is based on the results of the above studies and will be explained in detail below. Note that in the following explanation, the "%" means "mass %" unless otherwise clearly indicated.

First off, the technical concept for refining the crystal grains of weld metal of the present invention will be explained.

Weld metals of Cr—Ni-based stainless steels are classified by their ingredients into ingredients with primary crystal solidification phases of ferrite phases or austenite phases. Furthermore, they are classified into ingredients where the solidification is completed by these phases alone or ingredients where the solidification is completed by the dual phases of ferrite phases and austenite phases.

TiN is extremely good in lattice matching with the ferrite phase, so forms solidification nuclei for the ferrite phase. These promote equiaxing of the crystal grains ferrite phase and are effective for refining the ferrite crystal grains at the time of solidification. Further, Mg-based inclusions (including MgO—$Al_2O_3$ spinel phase) form nuclei for formation of TiN and promote formation of TiN. As a result, they promote the equiaxing of the crystal grains of the ferrite phase and refine the ferrite crystal grains at the time of solidification.

On the other hand, TiN is poor in lattice matching with the austenite phase, so will not form nuclei for solidification of the austenite phase much at all. Further, the interfacial energy between the liquid phase and austenite phase is larger than the interfacial energy between the liquid phase and ferrite phase, so an austenite phase is hard to form on the ferrite phase. The austenite phase grows independently without regard as to the formation and growth of the ferrite phase. That is, refinement of the crystal grains of the austenite phase cannot be expected.

Therefore, in weld metal, to use TiN- and Mg-based inclusions as nuclei for promotion of equiaxing of the crystal grains of the ferrite phase and thereby refine the ferrite crystal grains at the time of solidification, it is necessary to limit the ingredients of the weld metal to ingredients where the primary crystal solidified phase is the ferrite phase and where solidification is completed in the single ferrite phase.

When the weld metal is ingredients of duplex solidification of the primary crystal ferrite phase+austenite phase, even if the ferrite phase solidifies with equiaxial crystal grains, the austenite phase grows independently regardless of the formation and growth of the ferrite phase, so the austenite phase solidifies as columnar crystals and refinement of the crystal grains of the austenite phase is not achieved.

The inventors engaged in experiments as a result of which they discovered that in welding of duplex stainless steel, to make the primary crystal solidified phase of the weld metal the ferrite phase and complete the solidification in the single ferrite phase, it is sufficient to make the ingredients satisfy the relationship of 0.73×Cr equivalents−Ni equivalents≥4.0.

Here, the Cr equivalents and Ni equivalents are prescribed by the following (formula 1) and (formula 2).

Cr equivalents=Cr (mass %)+Mo (mass %)+1.5×Si (mass %)   (formula 1)

Ni equivalents=Ni (mass %)+0.5×Mn (mass %)+30×C (mass %)+30×N (mass %)   (formula 2)

Further, to refine the solidified crystal grains of the weld metal, in ingredients where the primary crystal solidified phase is the ferrite phase and where the solidification is completed in the single ferrite phase, TiN has to be formed before the solidification of the primary crystal ferrite.

For this reason, the inventors engaged in experiments and as a result discovered that it is sufficient to limit the content of Ti and the content of N so that TiN precipitates at a higher temperature than the temperature where the primary crystal ferrite phase solidifies (liquidus temperature). They discovered that by controlling the ingredients so as to satisfy the relationship Ti (mass %)×N (mass %)≥0.0004, TiN is reliably formed before the primary crystal ferrite solidifies and therefore the effect of refinement of the solidified crystal grains is obtained.

From the above, in the present invention, making the primary crystal solidified phase of the weld metal the ferrite phase and making the solidification be completed in the single ferrite phase and also making TiN reliably form before the solidification of the primary crystal ferrite so as to obtain the effect of refinement of the solidified crystal grains by making the ingredients of the flux cored wire used when welding the duplex stainless steel satisfy 0.73×Cr equivalents−Ni equivalents≥4.0 and Ti×N≥0.0004 are made requirements.

Here, the Cr equivalents and Ni equivalents are defined by the above (formula 1) and (formula 2).

Note, if the value of the 0.73×Cr equivalents−Ni equivalents exceeds 16.0, the room temperature structure becomes a single ferrite phase and the targeted duplex stainless steel is not achieved, so preferably the upper limit of this value is made 16.0.

Next, the reasons for limitation of the wire ingredients of the present invention for realizing the above technical concept will be explained below. Note, the contents of the ingredients described below are the total amounts (mass %) contained in the entire sheath and flux with respect to the mass of the wire as a whole.

First, in the present invention, to form the TiN- and Mg-based inclusions (including MgO—$Al_2O_3$ spinel phase) in the weld metal, the contents of the wire ingredients are prescribed as follows:

Al: Al is a deoxidizing element. In the copresence of Mg, it forms an MgO—$Al_2O_3$ spinel phase which forms nuclei for formation of TiN and refines the crystal grains of the weld metal structure. This effect is achieved with 0.002%, so this was made the lower limit. Further, if adding a large amount, a large amount of Al oxides are formed and the mechanical properties become inferior, so 0.05% was made the upper limit.

Mg: Mg forms Mg-based inclusions which form nuclei for formation of TiN and refine the weld metal structure. This effect is achieved with 0.0005%, so this was made the lower limit. Further, even if adding a large amount, the effect becomes saturated, the corrosion resistance falls, the penetration at the weld zone is reduced, slags form on the weld bead, and other problems arise, so 0.01% was made the upper limit. Mg-based inclusions, if oxides, sulfides, or other compounds containing Mg, have the effect of refining the solidified crystal grains. The MgO—$Al_2O_3$ spinel phase also has similar effects.

Ti: Ti forms TiN which forms nuclei for solidification of the ferrite phase and refines the weld metal structure. By adding this in combination with Mg, the effect is further improved. This effect is achieved with 0.001% or more, so this was made the lower limit. However, when over 0.5% is added, it causes the ductility and toughness to drop, so this was made the upper limit.

N: N forms TiN which forms nuclei for solidification and refines the weld metal structure. Further, N is a powerful austenite-forming element. When making the content of the austenite forming element Ni 1.0 to 10.0%, N is necessary from the viewpoint of the phase balance of the ferrite phase and austenite phase and improves the pitting resistance in a chloride environment. These effects are exhibited when the content is 0.10% or more, so this was made the lower limit. Further, if adding a large amount, the steel hardens and the toughness falls, so 0.30% was made the upper limit.

Note, when used in MIG welding or MAG welding, if the amount of N is large, blowholes will easily form, so preferably the upper limit is made 0.22%.

Further, to obtain this effect, the contents of the following ingredients are defined:

C: C is harmful to the corrosion resistance, but inclusion to a certain extent is necessary from the viewpoint of the strength, so 0.001% or more is added. Further, if the content is over 0.1%, the weld metal remarkably drops in toughness and ductility and, in the state as welded and when receiving reheating, this bonds with Cr etc. to cause a remarkable deterioration in the corrosion resistance in these areas. Therefore, the content was limited to 0.001 to 0.1%.

Si: Si is added as a deoxidizing element, but if less than 0.01%, the effect is not sufficient. On the other hand, if the content is over 1.0%, the ferrite phase falls in ductility along with which the toughness greatly drops, penetration at the time of welding is also reduced, and practical problems are therefore incurred. Therefore, the content was limited to 0.01 to 1.0%.

Mn: Mn is an austenite-forming element. When making the content of the austenite-forming element Ni 1.0 to 10.0%, 2.0% or more is necessary from the viewpoint of the phase balance of the ferrite phase and austenite phase. On the other hand, if over 6.0% is added, a large amount of fumes are generated at the time of welding and the ductility falls, so the content was limited to 2.0 to 6.0%.

Cr: Cr is a ferrite-forming element. It contributes to the improvement of the corrosion resistance as a main element of duplex stainless steel, but if its content is less than 17.0%, a sufficient corrosion resistance cannot be obtained. On the other hand, if its content exceeds 27.0%, the toughness deteriorates, so the content was limited to 17.0 to 27.0%.

Ni: Ni is an austenite-forming element. It is a main element of duplex stainless steel, but in the present invention, solidification must be completed in the single ferrite phase, so from the viewpoint of the mode of solidification and phase balance when adding the ferrite-forming element Cr in 17.0 to 27.0% and from the viewpoint of the higher material cost, the upper limit was made 10.0%. On the other hand, the lower limit is selected considering application to inexpensive type duplex stainless steel, but if its content is less than 1.0%, the toughness remarkably drops, so the content was limited to 1.0 to 10.0%.

Mo: Mo is an element which improves the corrosion resistance particularly in a chloride environment. To improve the corrosion resistance, 0.1% can be added, but if its content is over 3.0%, a sigma phase and other brittle intermetallic compounds are formed and the weld metal falls in toughness, so its content was limited to 0.1 to 3.0%.

P and S are unavoidable ingredients in a weld metal. They are restricted to low levels for the following reasons:

P: P, if present in a large amount, causes the high temperature weld crack resistance and toughness to fall at the time of solidification, so is preferably low in amount. The upper limit of its content was made 0.03%.

S: S also, if present in a large amount, causes the high temperature weld crack resistance, ductility, and corrosion resistance to fall, so is preferably low in amount. The upper limit of its content was made 0.01%.

The above are the basic ingredients of the wire of the present invention. The following ingredients may be selectively added.

Cu: Cu has a remarkable effect in improving strength and corrosion resistance. Further, 0.1% or more can be added as an austenite-forming element for securing toughness. However, even if over 2.0% is added, the effect is saturated, so when adding this, the content is made 0.1 to 2.0%.

Note that, in the present invention, the flux filled inside the sheath does not have to be particularly defined other than being an alloy added in the above ranges of contents for controlling the composition of ingredients in the weld metal.

Therefore, in flux cored wire, as the flux filled inside the sheath, for example, compounds usually added for improving the slag entrapment and arc stability such as $TiO_2$: 1 to 2%, $SiO_2$: 2 to 3%, $ZrO_2$: 1 to 2%, $Al_2O_3$: 0.3 to 0.8%, $Fe_2O_3$: 0.2 to 0.6%, $Na_2O$: 0.05 to 0.2%, $K_2O$: 0.01 to 0.1%, $AlF_3$: 0.01 to 0.1%, and other metal oxides or metal fluorides may be added.

However, the metal ingredients included as metal oxides or metal fluorides added for improving the slag entrapment and arc stability are excluded from the ranges of contents of metal ingredients used as the above alloys prescribed in the present invention.

The flux cored weld wire of the present invention does not have to be particularly limited in welding method such as TIG welding, MIG welding, MAG welding, plasma welding, submerged arc welding, etc. By defining the totals of the ingredients of the sheath of the flux cored wire used for welding and the ingredients included in the flux and migrating to the weld metal, equiaxing and refinement of the structure in the solidification process become possible and a duplex stainless steel weld joint superior in toughness and ductility of the weld zone is obtained.

EXAMPLES

Below, examples will be used to further explain the present invention.

Using, as a sheath, a ferritic stainless steel or ordinary steel and filling the inside with flux, flux cored wires having the ingredients shown in Table 1 in terms of mass % with respect to the mass of the wire as a whole and having wire diameters of 1.2φ were prepared. Note, as the flux, metal oxides and metal fluorides usually used for improving the slag entrapment and arc stability and also Ni, Cr, Mo, Ti, Mg, and other metal powders were filled. Next, 12 mm thick duplex stainless steel plates of the ingredients shown in Table 2 were provided with V-grooves of a groove angle of 60° and a root face of 0.5 mm, then the above flux cored wires were used for butt welding by MIG welding to prepare weld joints. Note, the welding conditions at this time were a welding current of 250 A, an arc voltage of 28V, a welding speed of 25 cm/min, and a shield gas of Ar+2% $O_2$.

Note, the solidification mode in Table 1 was indicated as "F" showing completion of solidification in the single ferrite phase and as "FA" showing completion of solidification in the dual phases of primary crystal ferrite+austenite.

The weld joints obtained by welding were observed for the structure of the weld metal, subjected to Charpy impact tests of the weld metal and to face and root bend tests of the weld joints, and evaluated for fineness and equiaxing of the solidified crystal grains, toughness, and bending ductility. Table 3 shows the results of evaluation.

The results of evaluation of the crystal grain size in Table 3 are indicated as "Good" when both the ferrite and austenite have crystal grain sizes of 50 μm or less and the equiaxing rate is 90% or more and as "Poor" when other structures. The Charpy absorbed energy of Table 3 showing the results of evaluation of toughness of the weld joint was obtained by taking 2 mmV notch Charpy test pieces from the weld joints in a direction vertical to the weld direction, performing a Charpy impact test at 0° C., and finding the absorption energy. The results of the face bend and root bend tests of Table 3 showing the results of evaluation of the bending ductility of the weld joints were obtained by taking test pieces (10 t×30 w×250 L mm) from the weld joints in directions vertical to the weld direction while removing excess buildup, subjecting the weld zones to roller bending from the face or root (bending radius: R=20 mm), and evaluating samples with no cracks as "Good" and ones with cracks as "Poor".

In Table 3, the No. 8 comparative example had a value of the (0.73×Cr equivalents−Ni equivalents) lower than the range of the present invention, so the weld metal solidified in the dual phases of ferrite+austenite, the solidified crystal grains coarsened, and the weld metal fell in both of the toughness and bending ductility. The No. 9 comparative example had an Ni outside the range of the present invention and had a value of (0.73×Cr equivalents−Ni equivalents) lower than the range of the present invention, so the weld metal solidified in the dual phases, the solidified crystal grains became coarser, and the weld metal fell in toughness and bending ductility. Further, the No. 10 comparative example had a value of (Ti×N) lower than the range of the present invention, while the No. 11 comparative example had an Al content and Mg content lower than the ranges of the present invention, so while the weld metal solidified in the single ferrite phase, the ferrite could not be equiaxed and refined, the solidified crystal grains coarsened, and the weld metal fell in both of the toughness and bending ductility. Furthermore, the No. 12 to No. 14 comparative examples solidified in the single ferrite phase, had (Ti×N) within the range of the present invention, and showed refinement of the solidified crystal grains, but had an Mn content, Si content, Cr content, Mo content, and N content outside the range of the present invention, so the weld metal fell in both toughness and bending ductility.

On the other hand, the Nos. 1 to 7 invention examples had contents of ingredients within the ranges of the present invention, so compared with the comparative examples, the crystal grains of the weld metal were finer and thereby the toughness and ductility were much superior.

TABLE 1

(mass %)

| Class | Symbol | C | Si | Mn | P | S | Ni | Cr | Mo | Cu | Al | Ti | Mg | N | 0.73Cr eq-Ni eq | Ti × N × 10000 | Solidification mode |
|---|---|---|---|---|---|---|---|---|---|---|---|---|---|---|---|---|---|
| Inv. ex. | 1 | 0.02 | 0.48 | 2.83 | 0.024 | 0.004 | 2.1 | 19.7 | 0.4 | — | 0.011 | 0.010 | 0.0008 | 0.214 | 4.66 | 21.4 | F |
| | 2 | 0.03 | 0.50 | 5.09 | 0.023 | 0.005 | 1.5 | 21.6 | 0.4 | — | 0.015 | 0.003 | 0.0010 | 0.182 | 6.21 | 5.5 | F |
| | 3 | 0.01 | 0.59 | 4.03 | 0.025 | 0.005 | 3.4 | 26.2 | 2.7 | — | 0.010 | 0.011 | 0.0034 | 0.115 | 12.58 | 12.7 | F |
| | 4 | 0.01 | 0.56 | 5.01 | 0.022 | 0.004 | 1.6 | 21.4 | 0.3 | — | 0.024 | 0.032 | 0.0029 | 0.202 | 5.99 | 64.6 | F |
| | 5 | 0.01 | 0.67 | 2.12 | 0.025 | 0.005 | 7.5 | 23.5 | 0.3 | — | 0.011 | 0.012 | 0.0024 | 0.143 | 4.96 | 17.2 | F |
| | 6 | 0.02 | 0.51 | 5.04 | 0.022 | 0.006 | 1.4 | 22.0 | 0.5 | — | 0.004 | 0.074 | 0.0054 | 0.110 | 9.16 | 81.4 | F |
| | 7 | 0.01 | 0.69 | 4.89 | 0.024 | 0.004 | 1.3 | 20.1 | 0.4 | 1.5 | 0.010 | 0.313 | 0.0010 | 0.109 | 8.41 | 341.2 | F |
| Comp. ex. | 8 | 0.02 | 0.51 | 5.14 | 0.023 | 0.007 | 1.9 | 20.1 | 0.5 | — | 0.009 | 0.021 | 0.0019 | 0.221 | 3.90 | 46.4 | FA |
| | 9 | 0.01 | 0.49 | 2.34 | 0.024 | 0.004 | 10.6 | 23.9 | 0.4 | — | 0.010 | 0.013 | 0.0015 | 0.139 | 2.04 | 18.1 | FA |
| | 10 | 0.01 | 0.53 | 5.02 | 0.022 | 0.003 | 1.6 | 21.5 | 0.5 | — | 0.016 | 0.002 | 0.0017 | 0.167 | 7.22 | 3.3 | F |
| | 11 | 0.02 | 0.50 | 4.97 | 0.022 | 0.004 | 1.7 | 21.7 | 0.6 | — | 0.001 | 0.011 | 0.0002 | 0.171 | 6.91 | 18.8 | F |
| | 12 | 0.02 | 0.43 | 6.43 | 0.024 | 0.004 | 1.5 | 21.1 | 0.5 | — | 0.023 | 0.018 | 0.0024 | 0.214 | 4.50 | 38.5 | F |
| | 13 | 0.03 | 1.94 | 5.02 | 0.022 | 0.005 | 1.6 | 29.2 | 1.2 | — | 0.014 | 0.022 | 0.0011 | 0.184 | 13.79 | 40.5 | F |
| | 14 | 0.02 | 0.56 | 4.86 | 0.025 | 0.004 | 1.6 | 23.1 | 3.3 | — | 0.018 | 0.009 | 0.0013 | 0.326 | 5.48 | 29.3 | F |

TABLE 2

(mass %)

| C | Si | Mn | P | S | Ni | Cr | Mo | N |
|---|---|---|---|---|---|---|---|---|
| 0.02 | 0.59 | 4.95 | 0.024 | 0.001 | 1.5 | 21.4 | 0.3 | 0.211 |

TABLE 3

| Class | Symbol | Crystal grain size | Charpy absorbed energy (0° C.: J) | Face bend | Root bend |
|---|---|---|---|---|---|
| Inv. ex. | 1 | Good | 131 | Good | Good |
| | 2 | Good | 127 | Good | Good |
| | 3 | Good | 117 | Good | Good |
| | 4 | Good | 138 | Good | Good |
| | 5 | Good | 125 | Good | Good |
| | 6 | Good | 112 | Good | Good |
| | 7 | Good | 109 | Good | Good |
| Comp. ex. | 8 | Poor | 39 | Good | Poor |
| | 9 | Poor | 29 | Good | Poor |
| | 10 | Poor | 26 | Good | Poor |
| | 11 | Poor | 31 | Poor | Poor |
| | 12 | Good | 22 | Poor | Poor |
| | 13 | Good | 33 | Poor | Poor |
| | 14 | Good | 37 | Poor | Poor |

INDUSTRIAL APPLICABILITY

By using the flux cored wire of the present invention, it is possible to obtain weld metal greatly improved in toughness and ductility. The industrial applicability of the present invention is extremely great.

The invention claimed is:

1. A flux cored wire for welding duplex stainless steel, comprising a steel sheath filled with a flux containing one or both of a metal oxide and metal fluoride for improving a slag envelopability or arc stability, designed to refine solidified grains, said flux cored wire containing, as chemical ingredients included in the steel sheath and the flux ingredients other than said one or both of the metal oxide and metal fluoride, by mass % with respect to the mass of the wire as a whole, C: 0.001 to 0.1%,
Si: 0.01 to 1.0%,
Mn: 2.0 to 6.0%,
Cr: 17.0 to 27.0%,
Ni: 1.0 to 10.0%,
Mo: 0.1 to 3.0%,
Al: 0.002 to 0.05%,
Mg: 0.0005 to 0.01%,
Ti: 0.0004/N (mass %) to 0.5%,
N: 0.10 to 0.30%, furthermore restricting
P to 0.03% or less and
S to 0.01% or less,
satisfying $$0.73 \times \text{Cr equivalents} - \text{Ni equivalents} \geq 4.0$$

and
having a balance of iron and unavoidable impurities, where $$\text{Cr equivalents} = \text{Cr (mass \%)} + \text{Mo (mass \%)} + 1.5 \times \text{Si (mass \%)}, \text{ and}$$

$$\text{Ni equivalents} = \text{Ni (mass \%)} + 0.5 \times \text{Mn (mass \%)} + 30 \times \text{C (mass \%)} + 30 \times \text{N (mass \%)}; \text{ and}$$

wherein the flux cored wire has a completion of solidification in a single ferrite phase.

2. A flux cored wire for welding duplex stainless steel as set forth in claim 1, further containing, as a chemical ingredient included in the steel sheath and flux other than said one or both of the metal oxide and metal fluoride, by mass % with respect to the mass of the wire as a whole, Cu: 0.1 to 2.0%.

* * * * *